Dec. 29, 1959 A. LINNEBACH 2,919,417

RING FILTER CIRCUIT

Filed March 1, 1954 3 Sheets-Sheet 1

INVENTOR
A. LINNEBACH
BY Philip M. Bolton
ATTORNEY

INVENTOR
A. LINNEBACH
BY
Philip M. Bolton
ATTORNEY

Dec. 29, 1959 A. LINNEBACH 2,919,417

RING FILTER CIRCUIT

Filed March 1, 1954 3 Sheets-Sheet 3

INVENTOR
A LINNEBACH
BY Philip M. Bolton
ATTORNEY

United States Patent Office 2,919,417

Patented Dec. 29, 1959

2,919,417

RING FILTER CIRCUIT

Adolf Linnebach, Stuttgart, Germany, assignor to International Standard Electric Corporation, New York, N.Y., a corporation of Delaware Application March 1, 1954, Serial No. 413,291

Claims priority, application Germany February 28, 1953

9 Claims. (Cl. 333—11)

This invention relates to a transmission circuit ring filter which is particularly applicable for very high frequencies (VHF). The invention may be employed for distributing the energy from one transmitter to two different loads. If one of the loads is a useful load (e.g. antenna), and the other one an auxiliary load, then the inventive transmission circuit may be employed as a connecting device having a variable operative attenuation. In this case the circuit may be employed for amplitude control or amplitude modulation, which is frequently required in navigation equipments.

Moreover, the invention may be employed for simultaneous telegraph and telephone operation. The problem arising in this respect is to feed an antenna from two or more transmitters (e.g. a picture transmitter as well as a sound transmitter in the telecommunication technique) in such manner that there appears no mutual interference between these transmitters.

According to the prior art there is known a ring filter circuit consisting of an annular and in most cases coaxial line of the length $3\lambda/2$ ($\lambda$=wavelength), and exhibiting four connecting terminals, for instance, open feeders. These connections are spaced at $\lambda/4$, so that between the outer connections there is a space of $3\lambda/4$. When applying two of these connections to respective generators (senders) and two to respective consumers (antenna components), then both consumers are fed by the two senders, without transmitting or receiving interference between each other, because the generators are separated from the consumers by $\lambda/2$ via the two ring sectors. Hence the potential appearing at one connecting point, is transmitted to the respective connecting point via the two ring sectors, whose wavelength difference amounts to $\lambda/2$, so that the two equal voltages, on account of their phase opposition, are compensated to zero.

This conventional type ring filter circuit is in most cases employed for the feeding of two consumers by means of two senders operating with equal or closely adjacent frequencies, which do not interfere with each other; for example, the feeding of a TV-antenna by picture and sound transmitters.

In this ring filter circuit the two consumers are fed inphase by one sender, and in phase opposition by the other sender, so that the range of practical application is extremely restricted (with regard to antennas, only rotating-field feeding). Therefore, this filter is not applicable to antennas with a single feeding point. Moreover, the distribution of energy to the two consumers cannot be varied, but is fixed by the construction.

The ring filter circuit according to the present invention is characterized in that its circumference, for instance at a mean transmission frequency, has the size $k.\lambda$ ($k$=1, 2, 3 . . .), and that it has three or more connections for loads and one or more connections for generators, and that the spaces between adjacent connections are $m\lambda/4$ ($m$=1, 2 . . .), and the path length difference between the connections, which are to be decoupled from each other via the two ring sectors, are about $(2n+1)\lambda/2$ ($n$=0, 1, 2 . . .), and that the ring sectors are equally loaded. In this respect it is not important to the functioning of the circuit, whether the filter is constituted of a normal two-wire line, of a coaxial line, or of a wave guide, although the following description is chiefly concerned with the use of coaxial lines. The characteristic impedance of the lines, within wide limits, does not influence the function of the filter.

The invention will be particularly described with reference to the figures of the accompanying drawings, in which.

Figure 1:
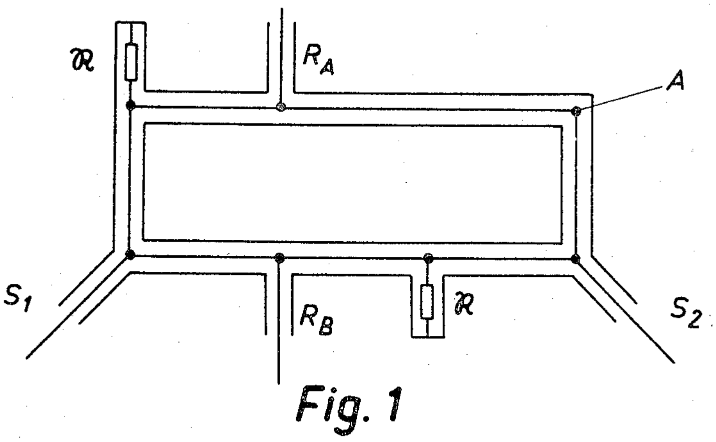
Fig. 1 shows a diagram of a ring filter circuit with a circumference of $2\lambda$.

The circumference of the ring filter shown in Fig. 1 is substantially $2\lambda$. It has two inlets for the senders $S_1$ and $S_2$, and four connections for loads. The two senders $S_1$ and $S_2$ are correlatively decoupled because the path length difference of the transmission channels between these two senders amounts to $\lambda/2$. Likewise the connections for the useful load $R_A$ and the auxiliary load (balance resistance) $R_B$, as well as between the two equal-sized resistances R are correlatively decoupled in the same way. The useful load $R_A$, e.g. a TV-antenna, is fed by the sender $S_1$, e.g. the picture transmitter, as well as by the sender $S_2$, e.g. a sound transmitter. Depending on the size and the frequency response of the two equal reactive impedances R, a portion of energy of the two senders $S_1$ and $S_2$ can be absorbed by the auxiliary load $R_B$. The reactive impedances R are denoted in Fig. 1 as concentrated elements, although they are generally formed by means of line sections in the conventional manner. The space between adjacent connections is $\lambda/4$, but the space between the connections for $S_2$ and $R_A$ is $3\lambda/4$.

Figure 2:
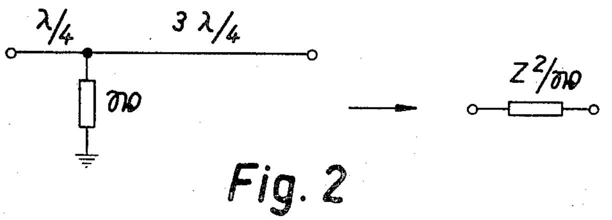
Fig. 2 shows a basic diagram of a resistance transformation.
Figure 3:
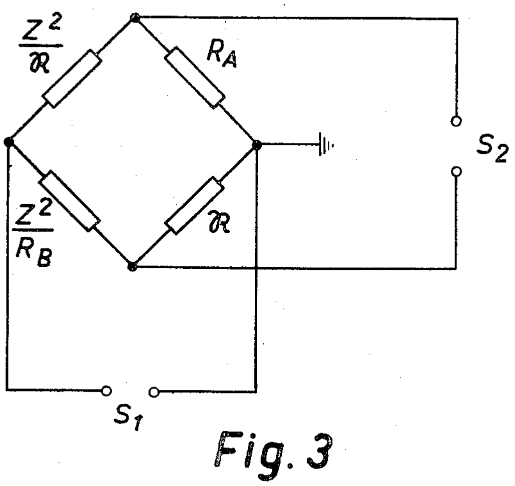
Fig. 3 shows an equivalent diagram of Fig. 1.

For the purpose of better understanding the conditions arising from this distribution of energy, the circuit according to Fig. 1 is first, traced back to a Maxwell bridge-circuit. Supposing the spaces between the connections of R and $S_1$ and of $S_1$ and $R_B$ are each extended by $\lambda/2$ which, as is known, has no influence on the functioning of the circuit. Upon applying to the upper left hand resistance, as well as to the resistance $R_B$ and the sender $S_2$, the known transformation according to Fig. 2, in which R denotes any suitable resistance, and Z the characteristic impedance of the line, there will result the bridge circuit arrangement as shown in Fig. 3. The circuit of Fig. 3 is in principle equivalent to the circuit of Fig. 1. Instead of the $\lambda/4$ or $3\lambda/4$ lines respectively joining the sender connection $S_2$, there may also be a direct symmetrical feeding-in by means of $S_2$ connected between R and $R_A$, or an asymmetrical feeding-in via a different kind of balanced repeater of conventional design.

The following can be taken from the circuit arrangement according to Fig. 3:

If the bridge circuit is balanced, i.e. $R_A=R_B$, then the two senders are completely decoupled. The power division into the resistance $R_A$ and the load resistance $$\frac{Z^2}{R_B}=R_A$$

only depends on the values of the resistances R and $Z^2/R$. Furthermore there exists an ideal matching for the picture and sound transmitter independently of the frequency, when the reactive branches are reciprocal networks with respect to the characteristic impedances of the lines. From this it may be seen, that the characteristic impedance Z can be chosen over large limits.

When selecting a suitable frequency response for the reactive impedances, the portions of the outputs reaching the useful load, can be adapted, as a function of the frequency, for a particular purpose; e.g., the operative attenuations of the transmission channels from $S_1$ to $R_A$, and from $S_2$ to $R_A$ can be made with a predetermined desired frequency response. This effect, for instance, can be utilized for suppressing the lower sideband of the picture spectrum, so that a separate single-sideband filter may be obviated; the attenuation curve for the lower sideband may be realized by a suitable selection of reactive impedances. However, it is extremely difficult to manufacture, for this purpose, resistance-reciprocal reactive elements displaying the same behaviour throughout the frequency range, especially when the structures are composed of several single resistances. The requirement for reciprocity only arises from the transformation of Fig. 2, whereas in the ring filter circuit according to Fig. 1, which is designed according to this invention, the two reactive impedances are equivalent. This will have an extremely advantageous effect upon the electrical properties, as well as upon the manufacture and assembly of the system.

Figure 4:
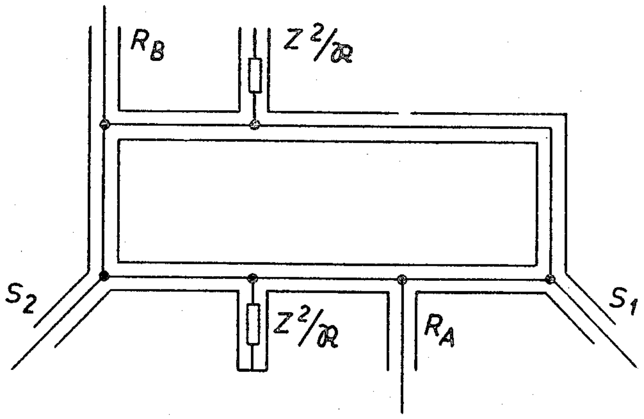
Fig. 4 shows a modification of the ring filter circuit according to Fig. 1.

It is also to be noted that the ring filter circuit as shown in Fig. 1 may be varied to form equivalent circuits. In the bridge circuit of Fig. 3, if the upper corner was grounded instead of the right-hand corner point, so that $S_1$ is connected symmetrically and $S_2$ asymmetrically, then there will result, by applying the transformation according to Fig. 2, the ring filter circuit as shown in Fig. 4, which is equivalent to the circuit arrangement of Fig. 1.

It is also to be noted that if, in Fig. 1, a reactive impedance was added at point A, it may be utilized to compensate any variations due to changes in frequency which might occur in practice.

The above description regarding the ring filter circuit shown in Fig. 1 illustrates that ring filters, designed according to the invention, and having a circumference equal to a whole multiple of the wavelength, enjoys certain advantages. It is possible, for instance, to insert into suitable points of the filter according to Fig. 1, line sections (pieces) of the length, ($\lambda$) and to provide, additional connections or else other connecting combinations, thus being able in a relatively easy manner, to solve many special problems.

In the following description, there is shown and described another embodiment of a ring filter circuit according to the invention; this embodiment being the most simple one, in which the circumference of the filter is equal to one wave-length.

Figure 5:
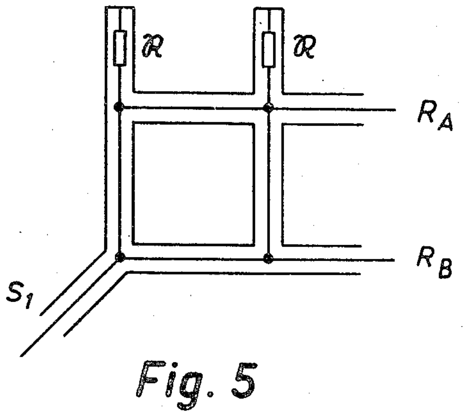
Fig. 5 shows a diagram of a ring filter circuit with a circumference of $1\lambda$.

In connection with the description of the filter shown in Fig. 1, it was said that the distribution of load between the resistances $R_A$ and $R_B$ depends on the size of the two reactive impedances. Accordingly, this filter can also be utilized for distributing the energy originating from one sender, e.g. $S_1$, to both consumers $R_A$ and $R_B$, which may be two antennas. In this case the connection for $S_2$ becomes superfluous and consequently also the wavelength long ($\lambda$) right-hand line section between the $R_A$ and R. The filter which is best adapted to the aforementioned purpose has the shape as shown in Fig. 5. Its circumference has the length of one wavelength ($\lambda$). The connections for $R_A$ and the adjacent resistance R are arranged at the same point. The two reactive impedances R are equal and variable. The means for tuning the resistances R may also be coupled mechanically, if a continuous synchronization of these resistances is desired. When substituting the reactive impedances R in Fig. 5 by switches or switching contacts, which may be actuated simultaneously or synchronously at a repeated interval, it is possible in a simple way to switch-over the energy originating at the sender $S_1$, in turn to the consumer $R_A$ and the consumer $R_B$. If these switching contacts are short-circuited (R=0), then the total transmitter energy will be conducted to the consumer $R_B$, however, if they are open ($R=\infty$), merely the consumer $R_A$ will be fed. Hence, it is possible to produce, by changing the values of the impedances R between 0 and $\infty$, a controlled amplitude or impulse modulation of the energy to one of the two consumers.

The exact tuning of the ring filter circuits is preferably a frequency lying approximately in the center of the frequency range in which the filter is employed, and which is preferably the geometrical mean of the two limiting frequencies of this particular range.

It is also possible to connect several ring filter circuits in series or other arrangements. Since the filters are substantially frequency-independent and may be considered constant, each individual ring filter circuit may be regarded as an independent element.

Figure 6:
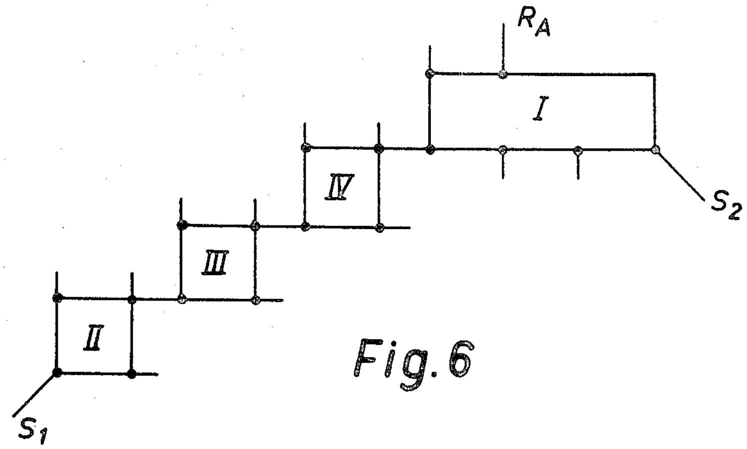
Fig. 6 shows a combination of a plurality of ring filter circuits.

One application of a circuit arrangement comprising several ring filters is shown in Fig. 6, in which the lines may be coaxial, parallel-wire, or wave-guides. By this filter arrangement the lower sideband of the sender $S_1$ (e.g. TV-picture transmitter) may be suppressed. The filter I corresponds to the one shown in Fig. 1. The filters II, III and IV, correspond to the filter as shown in Fig. 5. These filters are tuned in such a way that their attenuations $b_B$ exhibit maximums lying next to each other and which, in their total action, effect the suppression of a wide frequency spectrum (lower sideband).

The ring filter I (Fig. 6), by a suitable selection of the attenuation curve, can also be employed for suppressing undesired side frequencies above the range of transmission, for instance, the picture transmitting frequency in the range of the sound transmitting frequencies.

Figure 7:
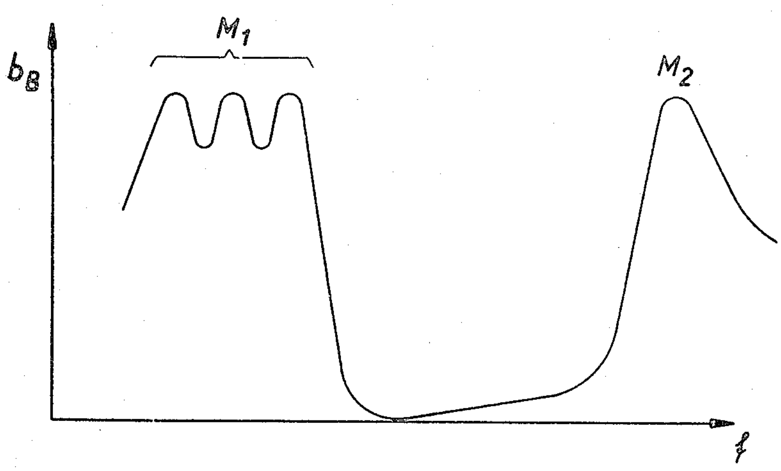
Fig. 7 shows the attenuation-curve of a ring filter circuit according to Fig. 6.

The resulting attenuation curve of the filters I to IV, i.e. the dependency of the attenuation $b_B$ of the transmission channel from $S_1$ to $R_A$ on the frequency $f$, is shown qualitatively in Fig. 7.

The multiple maximum $M_1$ is effected by the action of the filters II, III, and IV, the single maximum $M_2$, lying within the range of the sound transmitter frequencies of the sender $S_2$, is effected by the ring filter I.

What is claimed is:

1. An electrical high-frequency ring filter circuit comprising a transmission line formed into a closed ring whose perimeter is substantially equal to an integral multiple of twice the mean operating wave length $\lambda$, connecting terminals on said ring, a pair of load devices, each connected to a terminal, a pair of sources feeding each of said load devices, a pair of auxiliary reactive load control devices mutually decoupled by their spacing and connected to said ring, the spacing between a connecting terminal and its nearest neighbor being substantially equal to $m\lambda/4$, where $m$=an integer, said terminals being six in number, one pair serving for connection to generators, another pair serving for connection to respective said load devices, and a third pair serving for connection to respective said control devices, said six terminals being spaced round said perimeter with spacing between each terminal and its nearest neighbor being electrically equivalent to $\lambda/4$, with the two terminals of each pair of terminals spaced apart and electrically equivalent to $3\lambda/4$, and the path length difference between two complementary sections of said ring which interconnect the terminals of said load devices which are to be mutually decoupled being substantially equal to $(2n+1)\lambda/2$, where $n$ is zero or an integer.

2. A ring filter circuit according to claim 1, in which each said control device is constituted by a reactive impedance of magnitude and frequency response the same for each control device.

3. A ring filter circuit according to claim 1, in which said magnitude and frequency response are made such that the energies supplied by said generators are distributed between said load devices in predetermined proportions and with a predetermined frequency dependency.

4. A ring filter circuit according to claim 1, in which the impedance of each of said load devices is equal to the characteristic impedance of said transmission line.

5. A ring filter circuit according to claim 1, in which said generators are respectively the picture transmitter and the sound transmitter of a television station, and in which one of said load devices is an antenna and the other of said load devices is an artificial load of impedance equal to that of the antenna.

6. A ring filter circuit according to claim 1, in which the impedance characteristics of said control devices are made such that the lower sideband of the picture transmission frequency spectrum is suppressed.

7. A ring filter circuit according to claim 1, for the arbitrary distribution of energy from one generator between said pair of load devices, in which the said perimeter is of length λ, and wherein said terminals are four in number and spaced at λ/4 intervals round said perimeter, and adapted for respective connection, in the following sequence round the ring, the first to said one generator, the second to one of said control devices, the third to one of said load devices in parallel with the other of said control devices, and the fourth to the other of said load devices.

8. A ring filter circuit according to claim 6, in which said two load devices are of equal impedance.

9. A ring filter circuit according to claim 6, in which said two control devices are constituted by reactive impedances of like magnitude.

References Cited in the file of this patent

UNITED STATES PATENTS

| | | |
|---|---|---|
| 2,425,379 | Linbenbald | Aug. 12, 1947 |
| 2,661,424 | Goldstein | Dec. 1, 1953 |

FOREIGN PATENTS

| | | |
|---|---|---|
| 673,957 | Great Britain | June 18, 1952 |